United States Patent
Schwinn

(10) Patent No.: US 6,706,649 B2
(45) Date of Patent: Mar. 16, 2004

(54) WEB WITH TWO OUTER LAYERS AND AN ADHESIVE MIDDLE LAYER AS WELL AS PROCESS TO PRODUCE SAID WEB

(75) Inventor: Georg Schwinn, Gronau (DE)

(73) Assignee: Nordenia Technologies GmbH, Gronau (DE)

( * ) Notice: Subject to any disclaimer, the term of this patent is extended or adjusted under 35 U.S.C. 154(b) by 0 days.

(21) Appl. No.: 09/241,127

(22) Filed: Feb. 1, 1999

(65) Prior Publication Data

US 2001/0041484 A1 Nov. 15, 2001

(51) Int. Cl.$^7$ .............................. B32B 5/26; B32B 27/04
(52) U.S. Cl. ........................ 442/57; 442/58; 442/328; 442/329; 442/409; 428/317.5
(58) Field of Search .......................... 442/57, 58, 328, 442/329, 409; 428/317.5

(56) References Cited

U.S. PATENT DOCUMENTS

| | | | |
|---|---|---|---|
| 4,606,964 A | | 8/1986 | Wideman .................. 428/152 |
| 5,342,469 A | | 8/1994 | Bodford et al. ......... 156/244.22 |
| 5,415,925 A | * | 5/1995 | Austin et al. ............... 428/287 |
| 5,514,470 A | | 5/1996 | Haffner et al. .............. 428/246 |
| 5,681,645 A | * | 10/1997 | Strack et al. ............... 428/196 |

FOREIGN PATENT DOCUMENTS

| | | | | |
|---|---|---|---|---|
| CH | 614824 | | 6/1971 | |
| DE | 2835822 | | 3/1979 | |
| DE | 3608758 | | 10/1987 | |
| DE | 3618793 | | 12/1987 | |
| DE | 4243012 | | 6/1994 | |
| DE | 93198701 | | 7/1994 | |
| DE | 4322134 | | 11/1995 | |
| DE | 19647458 | * | 5/1998 | ............. B32B/5/26 |

* cited by examiner

Primary Examiner—Ula C. Ruddock
(74) Attorney, Agent, or Firm—Milde & Hoffberg, LLP

(57) ABSTRACT

A multi-layer elastic flat-shaped article having a predefined shape, consisting of at least two outer layers made of a porous fibrous or filamentous batting, and at least one inner layer, disposed between and adherent to a pair of said at least two outer layers. The inner layer is applied as at least one adhesive skein forming a latticework configuration. The adhesive skein is formed of a thermoplast having elastic properties at room temperature, and being adapted to recover its latticework configuration after tensile loading. The resulting article flat shaped article may be elastically stretched, and return to its original configuration. A preferred method for depositing the thermoplast is a printing process, for example intaglio printing, flexoprinting or screen printing. Nozzles may also be used to extrude hot thermoplast in a pattern defined by a relative movement of the outer layer or layers and the nozzle. The pattern may be continuous or interrupted.

6 Claims, 3 Drawing Sheets

WEB WITH TWO OUTER LAYERS AND AN ADHESIVE MIDDLE LAYER AS WELL AS PROCESS TO PRODUCE SAID WEB

FIELD OF THE INVENTION

The present invention relates to a multi-layer elastic flat-shaped article, formed from at least two outer layers comprising a porous fiber material, such as polyolefin fiber batting, and at least one middle layer, which consists of adhesive skeins applied in linear fashion.

BACKGROUND OF THE INVENTION

German Patent DE-AS 28 35 822, entitled "Absorptive Laminate and Procedure", relates to a laminate structure that consists of two absorbent layers formed from cellulose fibers, and a middle layer. The middle layer is an adhesive divided into dots or strip shapes, which can also be formed from intersecting lines. However, this patent does not disclose a multi-layer flat-shaped article that results in an air-permeable, highly elastic sheet, using fusion adhesives.

In the adhesive skein configuration according to FIG. 2 of German Patent DE-AS 28 35 822, care is taken to ensure that the adhesive distribution does not interrupt air permeability. As a result, the adhesive is provided, such that a highly elastic middle layer is produced, which gives elasticity to the flat shaped article, so that the fiber materials that form the outer layers can be easily distorted, but by themselves remain inelastic.

U.S. Pat. No. 5,342,469, expressly incorporated herein by reference, relates to a method for making a composite with a discontinuous adhesive structure.

U.S. Pat. No. 4,606,964, expressly incorporated herein by reference, relates to a bulked web composite article, and method for the manufacture thereof.

U.S. Pat. No. 5,514,470, expressly incorporated herein by reference, relates to a composite plastic-bonded material.

See also, U.S. Pat. Nos. 5,835,881, 5,789,065, 5,462,708, 5,283,733, 5,178,931, 4,801,482, and 5,159,706, expressly incorporated herein by reference.

SUMMARY AND OBJECTS OF THE INVENTION

In order to provide a multi layer laminate structure, having an air-permeable, highly elastic sheet, using fusion adhesives, the present invention uses adhesive skeins of a thermoplastic material that is elastic at room temperature. The configuration of the adhesive skeins forms a latticework which permits elastic stretching under tensile loading, and restoration of the adhesive skein configuration when tension is released.

According to the present invention, the adhesive skeins can be advantageously applied by means of a printing process. For this, normal printing processes are suitable, such as intaglio printing, flexoprinting, or screen printing. The adhesive skeins are applied in lattice fashion on one, or on both, layers of material to be laminated. Here, for example, a heated intaglio printer can be used, whose intaglio cylinder is engraved in such a way that a lattice-shaped, waffle-like application results on the batting material strip. The same holds true for the flexoprinting or screen printing processes. After the lattice-shaped application, the strips are placed adjacent to one on another and glued using the thermoplastic adhesive.

Materials suitable as batting substances are well known in the art. For example, materials which can be manufactured employing a plaiting strip and can be formed using the spun batten process or the melt-blown process. Thus, the thickness of the batten can vary greatly, according to the manufacturing process and parameters thereof. It is also possible to have the applied adhesive skein penetrate at least partially into the batting material, thus achieving improved attachment. According to the present invention, special value is placed on the configuration of the adhesive skeins. These can be applied in parallel, as straight or meandering strips. However, preferably they will be adhesive skeins which run into each other (intersect) in specular zig-zag or sinusoid curves that will overlap or touch at their vertices, so that a waffle-like configuration results.

It is also possible to regularly interrupt the adhesive skeins using a valve-controlled nozzle, so that relatively short segments are always produced; these likewise ensure that the flat-shaped article will be elastic. The interruptions may be regularly spaced or randomly or pseudorandomly spaced, such as by the inclusion of bubbled within the heated adhesive. However, the interruptions are preferably not coincident across the laminated structure, unless a frangible, weak, or irreversibly stretched location is desired.

Additionally, the invention relates to a procedure for manufacturing a multi-layer elastic flat-shaped article, which consists of at least two outer layers made of a porous fiber material and of at least one rubbery elastic middle layer.

A process according to the present invention is characterized in that, by means of a printing process or pressing out of skein, adhesive skeins which consist of a thermoplast that is elastic at room temperature, are applied to a substrate made of porous fiber material. The configuration of the adhesive skeins produces a two-dimensional latticework. Under tensile loading and relieving, elastic stretching and recovery of the adhesive skein configuration is permitted.

The adhesive can be applied using multiple nozzles, so that strands are formed perpendicular to a direction of movement of the material strips to be laminated. A waffle-shaped or lattice-type application, or a rectangular structure, can result from nozzles that move correspondingly opposite each other.

According to another aspect of the invention, it is possible to provide an adhesive thickness greater in the edge area of a flat-shaped article than in the middle area. The resulting flat-shaped article can be processed to form panty liners or sanitary napkins or similar items. Such a structure may also be useful to fabricate disposable diapers.

In each case, it is an aspect of the present invention that the adhesives employed which remain elastic at room temperature and can be processed as hot-setting adhesives. By elastic, it is meant that the material, in its applied configuration, will allow the composite structure, including two laminated layers, to be stretched without delamination of the skein from both layers or tension-related failure of the adhesive. The minimum tolerable degree of stretch may vary for differing applications will vary, for example, from 1% up to near the tensile elongation limit of the batting material. Often, however, it is desired that the batting not be subjected to destructive elongation. Therefore, the elongation of the laminate may advantageously be limited by a non-linear increase in tension as the adhesive is stretched. For example, as the skein pattern is stretched, the elements of the pattern become straightened. When they are almost fully straightened, the forces resisting elongation shift from the forces of the batting supporting the skein in its non-linear normal state to the elastic forces of the skein and laminated layers together. As the tension further increases, a further non-linear increase in tension may occur due to an inherent non-linear elongation-force relationship of either the adhesive, layers, or both. While preferably the skein does not delaminate from the layers during normal use, the product may be designed to selectively delaminate to provide desired elongation properties or as a preferred failure mode. If the elastic retains a tacky surface, it may, after elongation and partial delamination, re-adhere to the layers.

It should also be understood that, while the invention described below relates to production of a three layer laminate, greater number of layers may be adhered to achieve desired properties. It is also understood that the materials and configuration for each layer may differ. Thus, the laminate need not be reversible nor symmetric.

These and other objects will become apparent. For a full understanding of the present invention, reference should now be made to the following detailed description of the preferred embodiments of the invention as illustrated in the accompanying drawings.

BRIEF DESCRIPTION OF THE DRAWINGS

The invention will now be described with reference to the accompanying drawings, in which.

DETAILED DESCRIPTION OF THE PREFERRED EMBODIMENT

Figure 1:
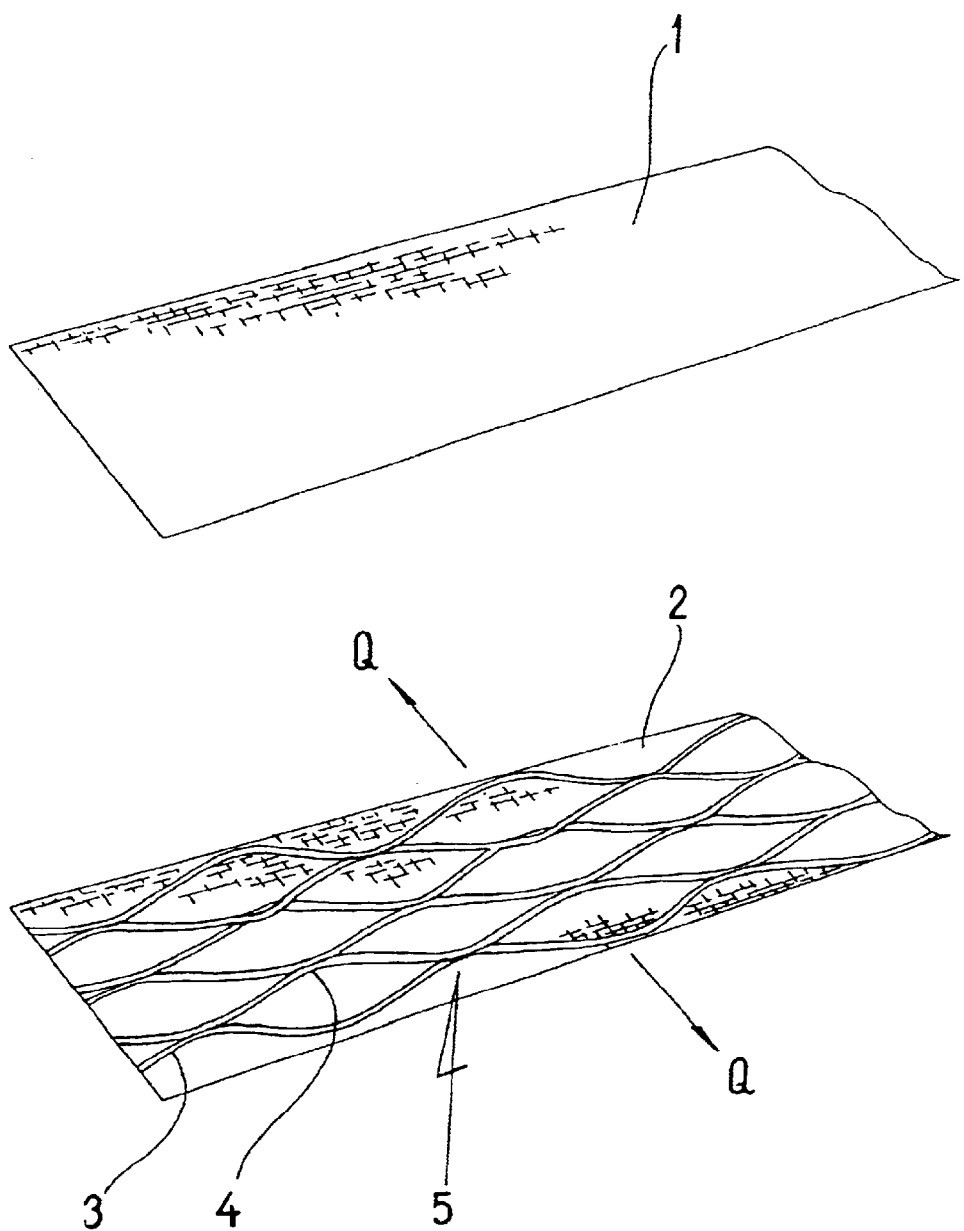
FIG. 1 according to the present invention is an embodiment of a multi-layer strip of material in a separated state.

The detailed preferred embodiments of the invention will now be described with respect to the drawings. Like features of the drawings are indicated with the same reference numerals.

FIG. 1 shows two strips of batting 1, 2, of which strip 2 is coated using heated intaglio printing (not shown) with a configuration of adhesive strands or skeins 3. The adhesive skeins have a thickness of about 0.1 to 1.5 mm, with a width of batting material strip 1, 2 of about 50 mm. As can be seen in FIG. 1, the adhesive skeins are laid so that they run in sinusoid curves. At their vertices 4, each adjacent pair of them overlap or touch in a minor symmetric configuration, thus producing a waffle-shaped configuration 5. If tension is exerted in transverse direction Q on the flat-shaped article which consists of the adhesive skeins and the two batting material strips 1, 2, then the adhesive skeins elongate and pull apart. However, since they consist of thermoplastics that are elastic at room temperature, restoration occurs after the tensile loading ceases, due to the flexible properties of the adhesive configuration.

Figure 3:
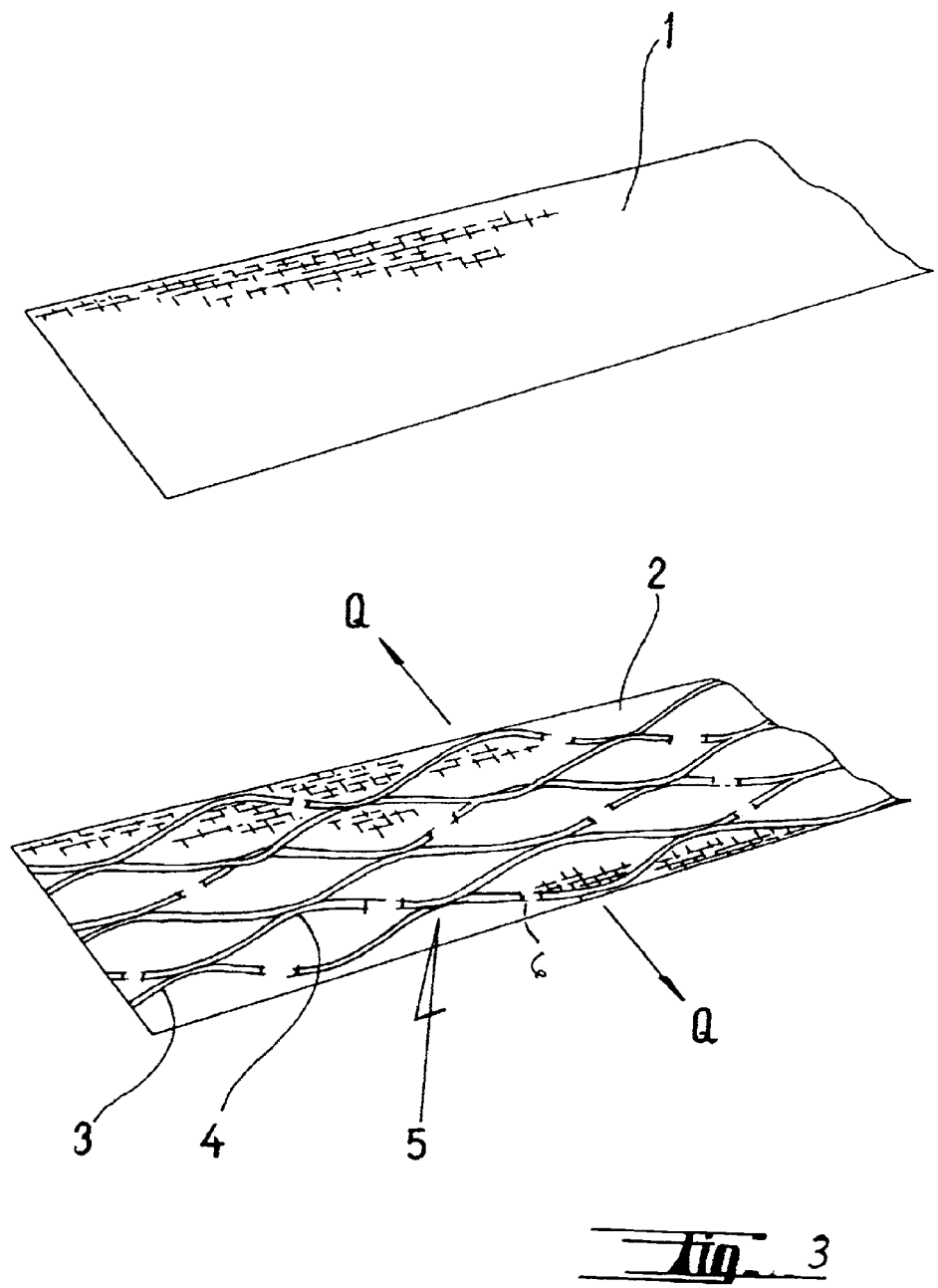
FIG. 3 according to the present invention shows a configuration similar to that of FIG. 1, with interrupted skeins.

As shown in FIG. 3, the strips 3, 4 may be interrupted, with gaps 6.

Application of the adhesive may also take place using a printing process such as flexoprinting or screen printing.

Figure 2:
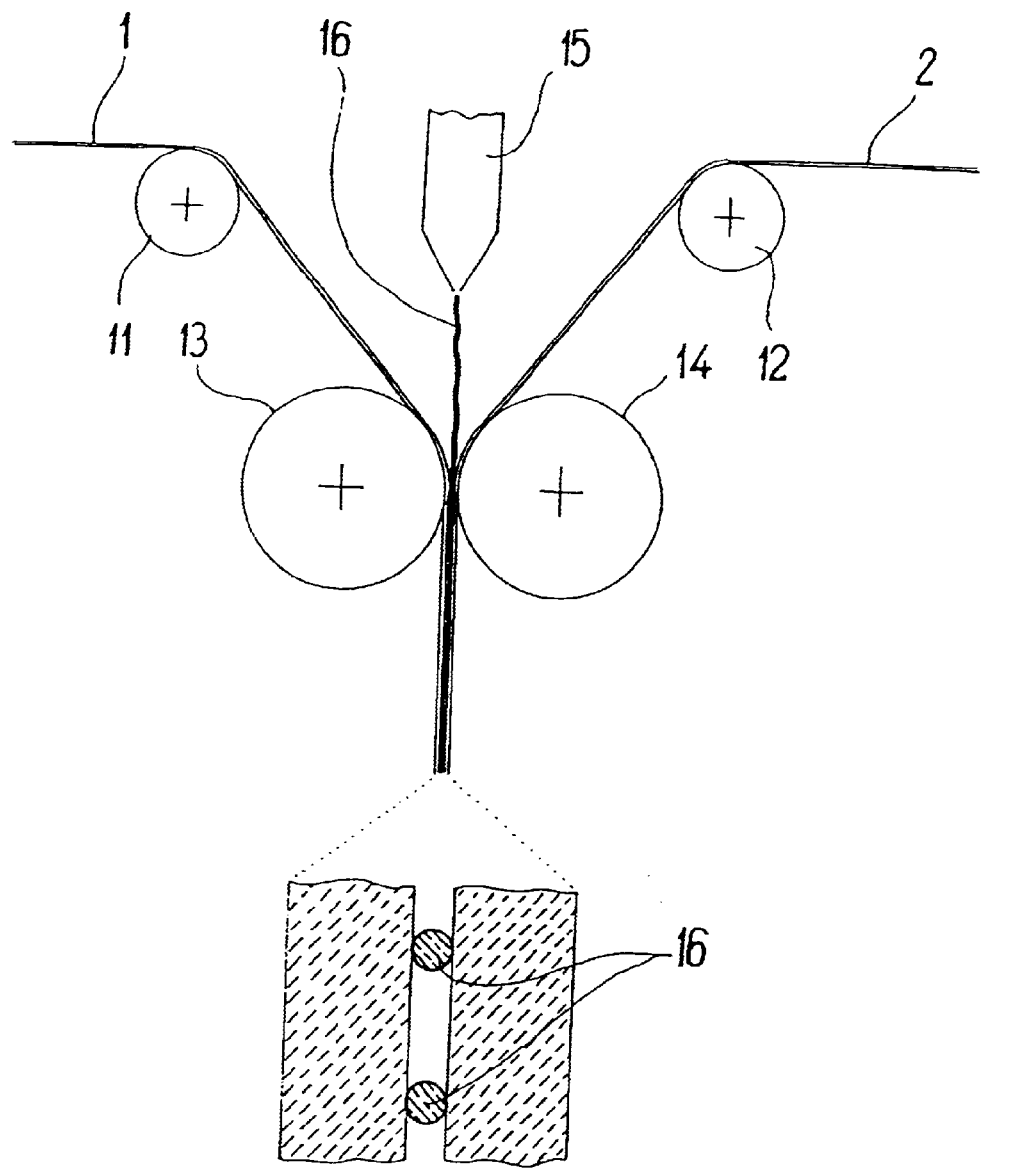
FIG. 2 according to the present invention is a schematic depiction of one phase in the manufacture of a laminated strip of material.

According to FIG. 2, a procedure is provided in which two batting material skeins 1, 2 are produced by a conveyor belt. These are advanced through the apparatus by means of deflection sheaves 11, 12. By means of two working rollers 13, 14, the two strips 1, 2 are brought together. Several nozzles 15 are placed transverse to the direction of the strip. With the aid of these nozzles 15, adhesive skeins 16 are applied directly from above into the gap between the two strips 1, 2 that have been brought together. The two strips 1, 2 are then compressed before the adhesive cools, to assure bonding.

The enlarged depiction in the lower part of FIG. 2 shows that adhesive skeins are present, which in cross section, appear as circles 16 in each instance. In each case, the adhesive is applied as a hot-melt in a heated liquid state, which in the course of the procedure that follows, becomes an elastic skein. Using this skein, multi-layer, elastic flat-shaped articles can be produced. These consist of at least two strips made of porous fiber material, especially non-woven sheets made of polyethylene, polypropylene or other polyolefins that can be brought together, producing a highly elastic flat-shaped article.

Using the above-named procedure, flat-shaped articles that are "breathable" can be produced. These are especially required for hygienic products such as panty liners, diapers, incontinence aids and the like. Through appropriate adjustments, the batten thickness and absorption capacity can each be greatly controlled, while the elasticity is ensured by the special middle layer. Also, these products can be manufactured at high speed, since heated printing cylinders are known by which a hot-melt thermoplastic can be readily and rapidly applied. These operate at great rotational speeds.

The adhesive itself can consist of, for example, materials such as styrene-butadiene-styrene (SBS), metallocene-polyolefins or the like, as known in the art.

There has thus been shown and described a novel laminate and process for the production thereof, which fulfill all the objects and advantages sought thereof. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A three-layer, air-permeable, flat-shaped laminate having stretchability and restoration properties consisting of:

two outer layers made of a porous fibrous or filamentous batting; and a rubbery elastic inner layer disposed between and adherent to said two outer layers;

said inner layer consisting of 0.1 to 1.5 mm thick strands of thermoplastic adhesives in a latticework configuration which adheres directly to said outer layers and penetrates partially into the batting material thus improving attachment, the thermoplastic adhesive strands having elastic properties at room temperature such that the lattice work permits elastic stretching under tensile loading and restoration when the tension is released.

2. The laminate according to claim 1, wherein the adhesive strands are applied as parallel strips.

3. The laminate according to claim 2, wherein said parallel strips are disposed along a path which is straight or meandering.

4. The laminate according to claim 1, wherein said adhesive strands run in zig-zag or sinusoid curves and wherein each adjacent pair of strands have vertices which touch or overlap in a mirror symmetric configuration.

5. The laminate according to claim 4, wherein the fibrous or filamentous batting comprises polyolefins.

6. The laminate according to claim 1, wherein the fibrous or filamentous batting comprises polyolefins.

* * * * *